United States Patent
Kiefer et al.

(10) Patent No.: US 7,462,223 B2
(45) Date of Patent: Dec. 9, 2008

(54) METHOD FOR PRODUCING A MEMBRANE FROM A CROSSLINKED POLYMER BLEND, AND CORRESPONDING FUEL CELL

(75) Inventors: Joachim Kiefer, Losheim am See (DE); Oemer Uensal, Mainz (DE)

(73) Assignee: BASF Fuel Cell GmbH, Frankfurt an Main (DE)

( * ) Notice: Subject to any disclaimer, the term of this patent is extended or adjusted under 35 U.S.C. 154(b) by 802 days.

(21) Appl. No.: 10/486,754

(22) PCT Filed: Aug. 10, 2002

(86) PCT No.: PCT/EP02/08992

§ 371 (c)(1),
(2), (4) Date: Dec. 1, 2004

(87) PCT Pub. No.: WO03/016384

PCT Pub. Date: Feb. 27, 2003

(65) Prior Publication Data

US 2005/0074654 A1 Apr. 7, 2005

(30) Foreign Application Priority Data

Aug. 16, 2002 (DE) ................................. 101 40 147

(51) Int. Cl.
*B01D 53/22* (2006.01)
*B01D 71/06* (2006.01)
*H01M 8/10* (2006.01)

(52) U.S. Cl. ............................ 96/4; 96/14; 210/500.27; 210/500.28; 210/500.37; 210/500.38; 210/500.39; 210/500.41; 521/27; 95/55; 429/33

(58) Field of Classification Search ....................... 96/4, 96/10, 11, 12, 13, 14; 95/45, 55; 210/500.21, 210/500.27, 500.28, 500.37, 500.38, 500.39, 210/500.41; 429/30, 33, 41; 521/27, 28; 55/524, DIG. 5
See application file for complete search history.

(56) References Cited

U.S. PATENT DOCUMENTS 4,814,399 A 3/1989 Sansone et al.
5,356,459 A * 10/1994 Bikson et al. .................. 96/13
5,429,759 A * 7/1995 Andrieu et al. ............. 252/62.2
5,525,436 A 6/1996 Savinell et al.
5,599,639 A 2/1997 Sansone et al.
5,716,727 A 2/1998 Savinell et al.
6,869,980 B2 * 3/2005 Cui ....................... 210/500.27
6,946,015 B2 * 9/2005 Jorgensen et al. .............. 96/14
7,247,191 B2 * 7/2007 Koros et al. .................... 96/14

FOREIGN PATENT DOCUMENTS

| DE | 100 52 242 A 1 | 5/2002 |
| DE | 101 10 752 A 1 | 9/2002 |
| JP | 10125560 | 5/1998 |
| JP | 2001118591 | 4/2001 |
| WO | WO 00/44816 | * 8/2000 |

OTHER PUBLICATIONS

Allen, N.S., et al., "Fundamentals of Polymer Degradation and Stabilisation", *Elsevier Applied Science*, (1992).
Gang, X., et al., "Electrolyte Additives for Phosphoric Acid Fuel Cells", *J. Electrochem. Soc.*, 140(4): 896-902 (1993).
Table of Contents of *Plastics Additives Handbook*, R. Gächter, et al., eds. (Hanser Publishers), (1990). *specifically:* Gugumus, F., "Stabilizers, Processing Aids, Plasticizers, Fillers, Reinforcements, Colorants for Thermoplastics".
Mustafa, A., "The Chemistry of Sultones and Sultams", *Chemistry Review*, 195-223 (1954).
Razaq, M., et al., "Perfluorosulfonimide as an Additive in Phosphoric Acid Fuel Cell", *J. Electrochem. Soc.*, 136(2): 385-390 (1989).
Wainright, J.S., et al., "Acid-Doped Polybenzimidazoles: A New Polymer Electrolyte", *J. Electrochem. Soc.*, 142(7): L121-L123 (1995).
Zweifel, H., "Stabilization of Polymeric Materials", *Springer*, (1998).

* cited by examiner

Primary Examiner—Jason M Greene
(74) *Attorney, Agent, or Firm*—Hamilton, Brook, Smith & Reynolds, P.C.

(57) ABSTRACT

The present invention relates to a polymer blend membrane comprising a bridged polymer which is produced by a selected process. The membrane of the invention displays a significantly improved fracture toughness (elongation at break/stress) combined with virtually unchanged other properties. The membranes of the invention are suitable for producing membrane-electrode units for fuel cells.

24 Claims, No Drawings

METHOD FOR PRODUCING A MEMBRANE FROM A CROSSLINKED POLYMER BLEND, AND CORRESPONDING FUEL CELL

RELATED APPLICATIONS

This application is the U.S. National Stage of International Application No. PCT/EP02/08902, filed Aug. 10, 2002, and published in German, which claims the benefit of German Application No. 101 40 147.7, filed Aug. 16, 2001.

BACKGROUND OF THE INVENTION

A fuel cell usually comprises an electrolyte and two electrodes separated by the electrolyte. In a fuel cell, a fuel, e.g. hydrogen gas, is fed to one of the two electrodes and an oxidant, e.g. oxygen gas, is fed to the other electrode and chemical energy is in this way converted into electric energy.

The electrolyte is permeable to hydrogen ions, i.e. protons, but not to reactive gases such as hydrogen gas and oxygen gas.

A fuel cell generally has a plurality of individual cells known as MEUs (Membrane Electrode Units) which each comprise an electrolyte and two electrodes separated by the electrolyte.

Electrolytes used for the fuel cell are solids such as polymer electrolyte membranes or liquids such as phosphoric acid. Recently, polymer electrolyte membranes have attracted attention as electrolytes for fuel cells. Materials used for polymer electrolyte membranes are, for example, perfluorosulfonic acid polymers or complexes of basic polymers and strong acids.

The perfluorosulfonic acid polymer generally has a perfluorohydrocatbon framework, e.g. a copolymer of tetrafluoroethylene and trifluorovinyl, and a side chain which is bound thereto and bears a sulfonic acid group, e.g. a side chain having a sulfonic acid group bound to a perfluoroalkylene group. The sulfonic acid group is able to release a hydrogen ion and thus be converted into an anion, and therefore conducts protons.

Polymer electrolyte membranes comprising complexes of basic polymers and strong

The perfluorosulfonic acid polymer generally has a perfluorohydrocarbon framework, e.g. a copolymer of tetrafluoroethylene and trifluorovinyl, and a side chain which is bound thereto and bears a sulfonic acid group, e.g. a side chain having a sulfonic acid group bound to a perfluoroalkylene group. The sulfonic acid group is able to release a hydrogen ion and thus be converted into an anion, and therefore conducts protons.

Polymer electrolyte membranes comprising complexes of basic polymers and strong acids have already been developed. Thus, WO96/13872 and the corresponding U.S. Pat. No. 5,525,436 describe a process for producing a proton-conducting polymer electrolyte membrane, in which a basic polymer, e.g. a polybenzimidazole, is dipped into a strong acid, e.g. phosphoric acid, sulfuric acid, etc.

A fuel cell in which such a polymer electrolyte membrane is used has the advantage that it can be operated at temperatures of 100° C. and above.

*J. Electrochem. Soc.*, Volume 142, No. 7, 1995, pages L121-L123, describes doping of a polybenzimidazole with phosphoric acid.

WO97/37396 and the corresponding U.S. Pat. No. 5,716,727 describe a process for producing a polymer electrolyte membrane, in which a polybenzimidazole is dissolved in trifluoroacetic acid, the solution is then admixed with phosphoric acid and the solvent is subsequently removed.

Even when a basic polymer in itself has a satisfactory mechanical strength, impregnation of the basic polymer with a strong acid for the purpose of imparting proton conductivity can result in its mechanical strength to be decreased to an unsatisfactory level. It is therefore desirable to achieve a further improvement in the mechanical strength of the basic polymer for the purpose of using the complex of the basic polymer and the strong acid as electrolyte membrane in a fuel cell, etc.

WO 00/44816 provides starting points for improving the mechanical strength and the swelling behavior of a membrane. Here, a solution comprising a basic polymer and a bridging reagent is used for casting the membrane and bridging is subsequently carried out. These membranes, too, are still in need of improvement in respect of their mechanical strength.

Further starting points for improving the mechanical strength may be found in the German patent application No. 10110752. Here, a solution comprising a basic polymer and a bridging reagent is used for casting the membrane and bridging is subsequently carried out in the presence of a basic catalyst. These membranes, too, are still in need of improvement in terms of their fracture toughness.

Further starting points for improving the mechanical strength may likewise be found in the German patent application No. 10052242.4. Here, a solution comprising a basic polymer and a polysulfone is used for casting the membrane. These membranes, too, are still in need of improvement in respect of their fracture toughness or the swelling behavior.

SUMMARY OF THE INVENTION

The present invention to a blend membrane comprising a bridged polymer, a process for producing it and a fuel cell comprising such a membrane.

It has now been found that bridging of the basic polymers and the bridging reagent in the presence of a basic catalyst provides a remedy when a blend of the basic polymer with a polysulfone is used in place of the basic polymer.

DETAILED DESCRIPTION OF THE INVENTION

The present invention provides a membrane comprising a bridged polymer obtainable by a process comprising the following steps:

A. preparing a solution comprising a basic polymer (polymer I) having at least one amino group per repeating unit and at least one bridging reagent and, in addition, at least one basic catalyst in at least one suitable solvent,
B. casting a film using the solution obtained from step A),
C. removing the solvent from step A),
D. carrying out the bridging reaction in the film obtained in step C),
E. doping the film obtained in step D) with a strong acid, wherein at least one further polymer based on a polysulfone (polymer II) in addition to the basic polymer (polymer I) is added in step A).

In general, the basic polymer and the polysulfone are dissolved in the solvent or solvent mixture, the solution obtained is admixed with the bridging reagent and the basic catalyst and the whole is subsequently mixed intimately. It is equally possible to prepare separate solutions of the polymers in the same solvent and to combine these.

There are no restrictions with regard to the bridging reagent, as long as it is a compound having a functional group which reacts with an amino acid. The bridging reagent preferably has at least two functional groups in the molecule which can react with the amino group and is generally an organic compound. Examples of such groups are epoxide groups and isocyanate groups. However, if the epoxide group and the isocyanate group are present in one bridging reagent molecule, the two groups react with one another, which is therefore not preferred.

The bridging reagent therefore preferably has at least two epoxide groups or isocyanate groups per molecule.

Examples of organic compounds having not less than two epoxide groups or not less than two isocyanate groups are epoxy compounds of the formula (II) and organic compounds of the formula (iii). In addition, the hydrogen atoms in the epoxide groups of the epoxy compounds of the formula (II) can be replaced by a halogen or a lower alkyl group.

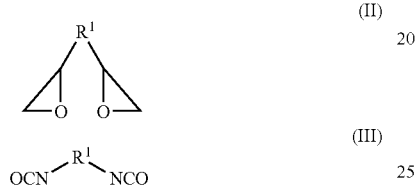

In the above formulae, $R^1$ is a hydrocarbon group having from 1 to 30 carbon atoms, for example a straight-chain or branched lower alkylene group which has from 1 to 15 carbon atoms and may bear a nitro group, an oxygen atom, an epoxide group or an aryl group as substituent, or a straight-chain or branched lower alkoxy group which has from 1 to 15 carbon atoms and may bear a nitro group, an epoxide group or an aryl group as substituent. For the present purposes, aryl groups include heteroaryls having from 4 to 20 carbon atoms; particularly preferred aryls are phenyl, naphthyl and indenyl.

The term lower alkyl used in the context of compounds of the formulae (II) and (III) refers to an alkyl group having from 1 to 15 carbon atoms.

The term aryl or heteroaryl used in the context of compounds of the formulae (II) and (III) refers to an aryl or heteroaryl having from 4 to 20 carbon atoms.

Examples of $R^1$ are the following groups:

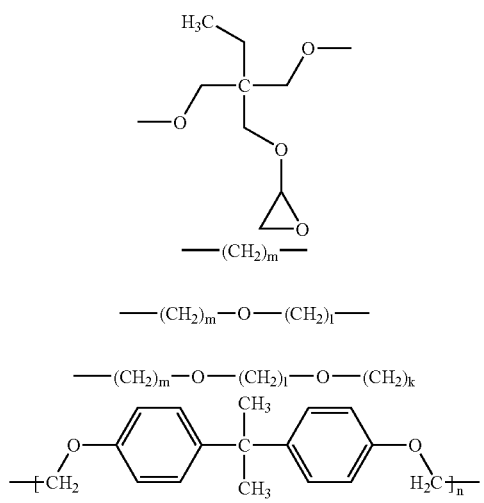

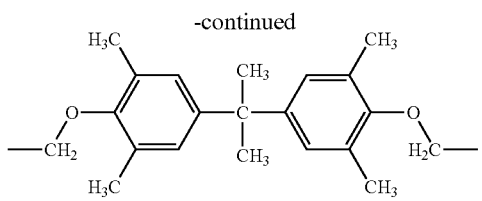

In the above formulae, m, k and l are identical or different and are each an integer from 1 to 6. The index n is an integer from 1 to 10 and is preferably 1.

An example of a bridging reagent whose molecule contains three functional groups which react with an amino group is the following compound:

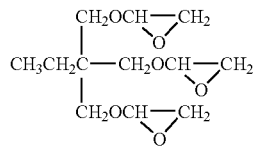

Particularly preferred bridging reagents are bisphenol A glycidyl ether [BPAGDE] and 1,4-butanediol diglycidyl ether.

The solution prepared in step A) preferably contains from 0.1 to 7 mol % of the bridging reagent per unit of the basic polymer, more preferably from 0.5 to 6 mol % of the bridging reagent per unit of the basic polymer and particularly preferably from 1 to 6 mol % of the bridging reagent per unit of the basic polymer. If the proportion of bridging reagent is too high, impregnation of the basic polymer with a strong acid becomes difficult. On the other hand, if the proportion of bridging reagent is too low, the mechanical strength of the polymer membrane is not sufficiently improved.

The solution from step A) preferably comprises from 1 to 99 percent by weight of the basic polymer, with the bridging reagent and the basic catalyst being included, and from 99 to 1 percent by weight of the polymer based on polysulfone.

The solution particularly preferably comprises from 5 to 95 percent by weight of the basic polymer, with the bridging reagent and the basic catalyst being included, and from 95 to 5 percent by weight of the polymer based on polysulfone.

The solution very particularly preferably comprises from 10 to 90 percent by weight of the basic polymer, with the bridging reagent and the basic catalyst being included, and from 90 to 10 percent by weight of the polymer based on polysulfone.

In a further embodiment of the invention, the solution comprises from 50 to 90 percent by weight of the basic polymer, with the bridging reagent and the basic catalyst being included, and from 50 to 10 percent by weight of the polymer based on polysulfone.

As basic polymer, use is made of a basic polymer having at least one amino group in a repeating unit. Since the amino group is present in the repeating unit, the polymer is basic and the amino group can react with the bridging agent. With a view to the reactivity toward the bridging agent, the amino group in the repeating unit is preferably a primary or secondary amino group.

The repeating unit in the basic polymer preferably comprises an aromatic ring having at least one nitrogen atom. The aromatic ring is preferably a five- or six-membered ring which contains from one to three nitrogen atoms and can be fused to another ring, in particular another aromatic ring.

The basic polymer is preferably soluble in the same solvent as the polymer based on polysulfone. Specifically, preference is given to at least 1 percent by weight of the basic polymer, more preferably not less than 2 percent by weight, being dissolved in a solution. These features aid the formation of a uniform polymer membrane without pores being formed therein.

Basic polymers preferred for the purposes of the present invention include, inter alia, polybenzimidazoles, polyimidazoles, polyvinylimidazoles, polybenzobisimidazoles and their copolymers. Among these, preference is given to polybenzimidazoles.

Preferred polybenzimidazoles have the formula:

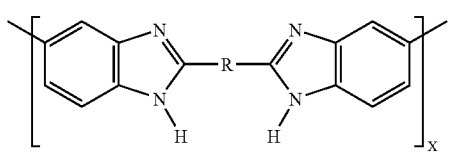
(I)

where R is alkylene, perfluoroalkylene or a substituent of one of the following formulae:

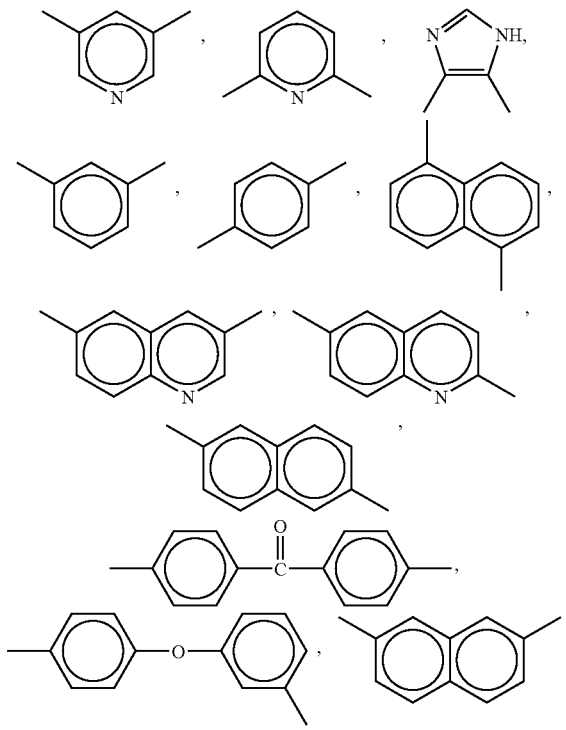

and each alkylene and perfuoroalkylene group R preferably has from 1 to 10 carbon atoms, particularly preferably from 1 to 6 carbon atoms.

Further polybenzobisimidazoles which can be used as basic polymers are those of the formula:

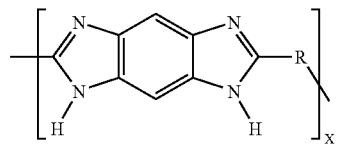

where R is as defined above.

A strongly acidic group such as a sulfonic acid group ($-SO_3H$), a phosphoric monoester group ($-O-P(=O)(OH)_2$), etc., can be introduced via a linker into the amino group of the polybenzimidazoles or polybenzobisimidazoles.

Possible linkers are the groups R mentioned above. As an alternative thereto, the linker can be a linear or branched hydrocarbon group having from 1 to 20 carbon atoms which may be substituted by a fluorine atom and interrupted by an oxygen atom ($-O-$) or a group of the formula $-N(R^2)-$, where $R^2$ is a hydrogen atom or a lower alkyl group having from 1 to 6 carbon atoms. Possible hydrocarbon groups are: a lower alkyl group which has from 1 to 20 carbon atoms and may be interrupted by an oxygen atom or an arylene group, e.g. a phenylene group, and be branched; and an arylene group, e.g. a phenylene group, which may be substituted by a lower alkyl group having from 1 to 20 carbon atoms, a lower alkoxy group having from 1 to 20 carbon atoms, a sulfonic acid group, an amino group, a fluorine atom, etc. A possible alternative is a group of the formula $-(CR^3R^4)_p-O-(CR^5R^6)_q-$, where p and q are each, independently of one another, an integer from 1 to 10 and $R^3$, $R^4$, $R^5$ and $R^6$ are identical or different and are each, independently of one another, a hydrogen atom; a fluorine atom; a lower alkyl group having from 1 to 6 carbon atoms or a lower alkoxy group having from 1 to 6 carbon atoms; an aryl group, e.g. a phenyl group, which may be substituted by a lower alkyl group having from 1 to 6 carbon atoms, a lower alkoxy group having from 1 to 6 carbon atoms, a sulfonic acid group, an amino group, a fluorine atom, etc.; or a strongly acidic group such as a sulfonic acid group, a phosphoric monoester group and preferably a hydrogen atom; a fluorine atom or a lower alkyl group having from 1 to 6 carbon atoms.

Thus, for example, a group of the formula $>N-(CR^3R^4)_r-SO_3H$, where N is a nitrogen atom in the imidazole ring of the polybenzimidazoles or polybenzobisimidazoles, r is an integer from 1 to 20 and $R^3$ and $R^4$ are as defined above, can be introduced into the polybenzimidazoles or polybenzobisimidazoles.

When a strongly acidic group is introduced on the nitrogen atom of the polybenzimidazoles or polybenzobisimidazoles via the linker, it is not necessary for the linker and the strong acid to be introduced on all nitrogen atoms. It is also possible to introduce the linker and the strong acid on only some of the nitrogen atoms, with hydrogen atoms remaining bound to the other nitrogen atoms. Since the remaining hydrogen atoms can react with the bridging agent, this is preferred.

For example, the linker and the strong acid can be introduced on from 5 to 85 percent of the nitrogen atoms of the basic polymer, e.g. the nitrogen atoms of the imidazole ring, in particular on from 10 to 75 percent of the nitrogen atoms and very particularly preferably on from 15 to 45 percent of the nitrogen atoms.

The basic polymer can be sulfonated or sulfoalkylated by reaction with a sulfone in solution. Here, for example, a solution of from 1 to 30 percent by weight of the basic polymer, in particular a solution of from 5 to 20 percent by weight of the basic polymer, is used. As solvent for the sulfonation or sulfoalkylation, preference is given to using the solvent for the liquid medium which is described further below.

A description of this reaction may be found, for example, in U.S. Pat. No. 5,599,639, U.S. Pat. No. 4,814,399 and Ahmed Mstafa, Chemical Review, pp. 195-223(1954). All these documents are hereby expressly incorporated by reference.

The basic polymer is preferably selected from the group consisting of polybenzimidazoles, polyimidazoles, polyvinylimidazoles and polybenzobisimidazoles.

As an alternative thereto, the basic polymer can already have a strongly acidic group in its repeating unit. The presence of the strong acid imparts proton conductivity. According to the present invention, the polymer blend further comprises an additional polymer based on polysulfone.

For the purposes of the present invention, polymers based on polysulfone are polymers comprising recurring units which have linking sulfone groups and correspond to the formulae 2A, 2B, 2C, 2D, 2E, 2F and/or 2G;

(2A)

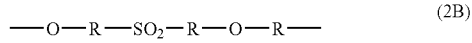
(2B)

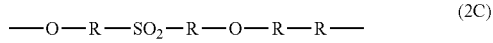
(2C)

-continued

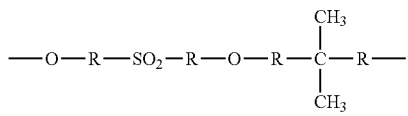
(2D)

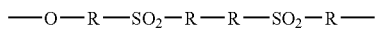
(2E)

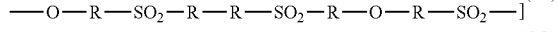
(2F)

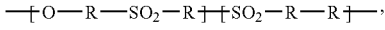
(2G)

where the radicals R are identical or different and are each, independently of one another, 1,2-phenylene, 1,3-phenylene, 1,4-phenylene, 4,4'-biphenyl, a divalent radical of a heteroaromatic, a divalent radical of a C10-aromatic and/or a divalent radical of a C14-aromatic.

Examples of heteroaromatics are, pyridine and quinoline. An example of a C10-aromatic is naphthalene, and an example of a C14-aromatic is phenanthrene.

Polysulfones which are preferred for the purposes of the present invention include homopolymers and copolymers, for example random copolymers such as ®Victrex 720 P and ®Astrel. Particularly preferred polysulfones are:

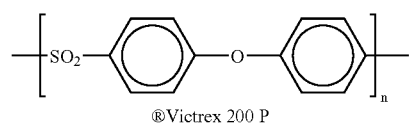
(2H)

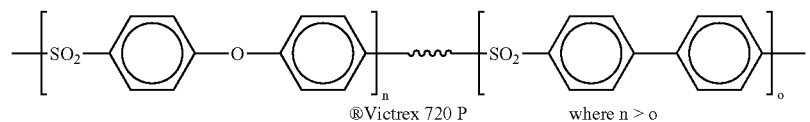
(2I)

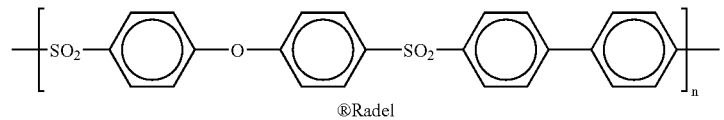
(2J)

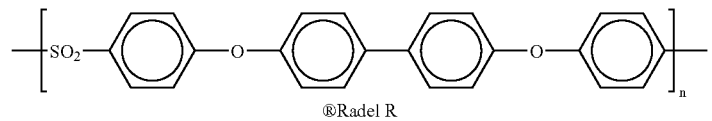
(2K)

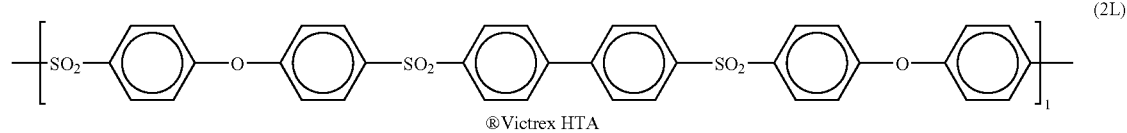
(2L)

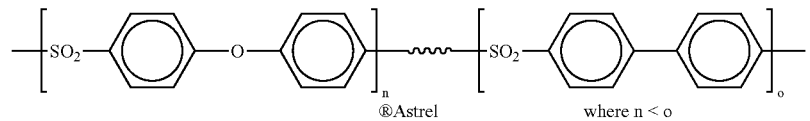
(2M)

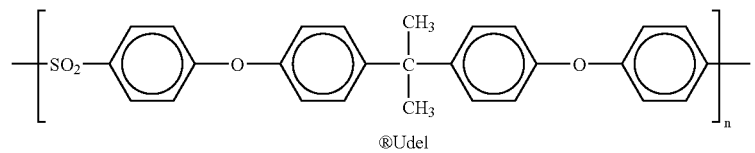
(2N)

A very particularly preferred polysulfone is ®Radel R.

The polysulfones which can be used according to the invention may be substituted. The polysulfones used according to the invention preferably have no sulfonic acid groups (—SO$_3$H) or protonated sulfonic acid groups (—SO$_3^-$M$^+$). Here, M$^+$ is an inorganic or organic cation. Such cations can impair the mechanical properties of the doped polymer membrane.

In a preferred embodiment of the present invention, the polysulfones are not substituted.

In another preferred embodiment of the present invention, the number average molecular weight of the polysulfones is greater than 30,000 g/mol.

As solvent for the liquid medium, preference is given to a solvent which does not react with the bridging agent. Preference is given to an organic solvent, in particular a polar organic solvent. As organic solvents, specific mention may be made of lower amides such as N-methyl-2-pyrrolidone, N,N-dimethylacetamide, dimethylformamide; dimethylsulfoxide, etc. It is also possible to use a mixture of these solvents. The liquid medium can be either a solution or a suspension. In the case of a solution, the polymers are dissolved in the solvent. In the case of a suspension, polymer particles serving as disperse phase are dispersed in a solvent serving as continuous phase. As an alternative thereto, the liquid medium can be a slurry or a paste.

A film is subsequently produced from the solution from step A) (step B). For this purpose, the solution is, for example, poured onto a planar substrate and then dried at atmospheric pressure or under reduced pressure. As an alternative thereto, a polymer blend can be converted into the film with the aid of a doctor blade process.

The substrate for casting or the doctor blade process can be a semiconductor such as a silicon wafer, a synthetic polymer such as poly(ethylene terephthalate) or a metal such as stainless steel. If, for example, a roll of poly(ethylene terephthalate) is used as substrate, a continuously operating casting unit can be used for producing a film having a constant width and any thickness. In this case, the solution is poured onto the substrate and runs through a slit having a prescribed opening and then through a drying oven to be dried by means of a stream of warm air.

As an alternative thereto, film formation can be carried out by the method described in the Japanese patent application No. Hei 10-125560.

Here, the solution is poured into a cylinder having a cylindrical inner surface and the cylinder is subsequently set into rotation. At the same time, the solvent is evaporated under the centrifugal force caused by the rotation, resulting in a cylindrical polymer film of largely uniform thickness being formed on the inner surface of the cylinder.

A polymer blend having a uniform matrix can be formed by this method. This method described in the Japanese patent application Hei 10-125560 is likewise incorporated by reference into the present description.

Removal of the solvent in step C) can be carried out by means of drying. Drying can be aided by heating under a reduced pressure of not more than 1 atmosphere, preferably not more than 0.1 atmosphere and more preferably not more than 0.05 atmosphere.

Bridging in step D) is advantageously carried out by heating, so that bridging (step D) and drying (step C) can occur simultaneously in one step.

As an alternative thereto, heating for the purpose of drying the film can be restricted to a temperature below the reaction temperature of the bridging reagent and the film can subsequently be heated strongly for the purpose of bridging. Warm/ hot air can be used for heating for the purpose of drying or for heating for the purpose of bridging.

Bridging in step D) can also be effected by irradiation with electromagnetic waves (photochemical reaction).

Bridging in step D) can also be effected by action of IR or NIR radiation (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in this case in the range from 5 to 200 kGy.

Additional crosslinking can be effected on the surface by action of heat in the presence of atmospheric oxygen. This hardening of the membrane surface results in a further improvement in the properties of the membrane.

The two latter methods can also be carried out or repeated after impregnation/doping. The materials properties can in this way be influenced in a targeted manner.

In the bridging reaction, the epoxide compound of the formula (IIa) reacts with the polybenzimidazole of the formula (I) to form a bridge to a polymer chain.

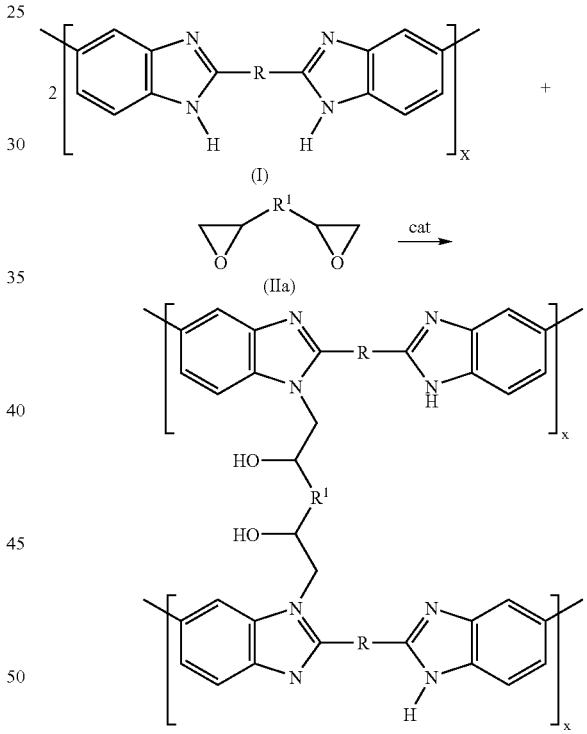

In the above formulae, R$^1$ is as defined above.

In a completely analogous manner, the isocyanate compound of the formula (III) reacts with the polybenzimidazole of the formula (I) to form a bridge to a polymer chain.

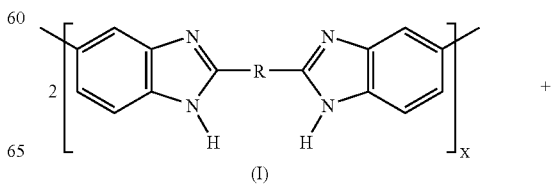

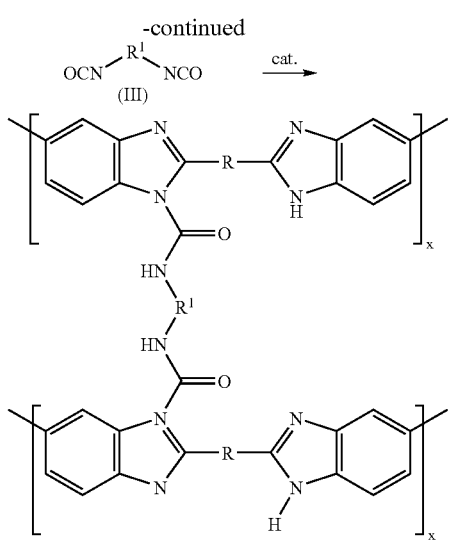

In the above formulae, $R^1$ is as defined above.

In the interest of simplicity, the bridge has been shown between different polymer chains in the above formulae. However, it is also possible for a bridge to be formed between parts of the same polymer chain or within a repeating unit.

For the purposes of the present invention, the basic polymer can be impregnated with a strong acid for the purpose of making it proton-conductive (step E). Impregnation/doping can be carried out using the strong acid in the form of the liquid medium. As an alternative thereto, impregnation/doping with the strong acid can also be carried out after film formation (step C) but before heating or bridging. Impregnation with the strong acid can, however, also be carried out after heating.

The embodiment in which impregnation is carried out using the strong acid in the form of the liquid medium involves addition of a strong acid to the liquid medium. The bridging reagent preferably does not react with the strong acid.

Impregnation with the strong acid is preferably carried out after heating of the film in step C). The bridged, basic polymer blend has an improved mechanical strength and can be handled more easily. Since the bridging reagent has already reacted, reaction of the strong acid with unreacted bridging reagent is very limited.

The film of bridged, basic polymer blend can be dipped into a strong acid so that the film is impregnated with the strong acid and becomes a membrane. The basic polymer blend can be dipped into a highly concentrated strong acid at a temperature of at least 20° C., preferably at least 40° C. and more preferably at least 50° C., for a period of not more than 5 hours, preferably not more than 1 hour.

Carrying out the dipping step at 20° C. or above makes it possible to shorten the time of immersion in the strong acid. With a view to the stability of the polymers and the safety precautions required for handling strong acids at high temperatures, dipping is carried out at not more than 200° C. or below, preferably at 100° C. or below and very particularly preferably at 80° C. or below.

Possible strong acids are protic strong acids. For example, preference is given to using phosphoric acid and/or sulfuric acid.

For the purposes of the present invention, "phosphoric acid" encompasses polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$) and metaphosphoric acid. The phosphoric acid, in particular orthophosphoric acid, preferably has a concentration of at least 80 percent by weight, particularly preferably a concentration of at least 85 percent by weight, more preferably a concentration of at least 89 percent by weight. The reason for this is that the basic polymer can be impregnated with a larger number of molecules of strong acid as the concentration of the strong acid increases.

If the film from step C) comprises a polysulfone having sulfonic acid groups, the treatment in step E) can also be carried out in water or an aqueous, dilute acid.

The polymer electrolyte blend membrane obtained according to the invention, namely the complex of the basic polymer blend and the strong acid, is proton-conducting and can therefore be used advantageously as electrolyte for cells. Nevertheless, the polymer electrolyte is not restricted to use for cells, but can also be used as electrolyte for a display element, an electrochromic element or various sensors.

Possible basic catalysts are basic oxides and hydroxides of elements of main groups I, II and III of the Periodic Table, hydrides of elements of main group I of the Periodic Table and organolithium compounds, preferably KOH, LiOH, NaOH, RbOH, CsOH, Ca(OH)$_2$, Mg(OH)$_2$, Ba(OH)$_2$, LiH, NaH, KH, methyllithium and butyllithium.

The basic catalyst is added to the solution in step A) in amounts of from 0.01 to 5 mol %, preferably from 0.02 to 3 mol %, particularly preferably from 0.5 to 2.5 mol %, based on the bridging reagent used.

To improve the use properties further, additional fillers, in particular proton-conducting fillers, and also additional acids can be added to the membrane. The addition can be performed in step A.

Nonlimiting examples of proton-conducting fillers are

| | |
|---|---|
| Sulfates such as | CsHSO$_4$, Fe(SO$_4$)$_2$, (NH$_4$)$_3$H(SO$_4$)$_2$, LiHSO$_4$, NaHSO$_4$, KHSO$_4$, RbSO$_4$, LiN$_2$H$_5$SO$_4$, NH$_4$HSO$_4$, |
| Phosphates such as | Zr$_3$(PO$_4$)$_4$, Zr(HPO$_4$)$_2$, HZr$_2$(PO$_4$)$_3$, UO$_2$PO$_4$•3H$_2$O, H$_8$UO$_2$PO$_4$, Ce(HPO$_4$)$_2$, Ti(HPO$_4$)$_2$, KH$_2$PO$_4$, NaH$_2$PO$_4$, LiH$_2$PO$_4$, NH$_4$H$_2$PO$_4$, CsH$_2$PO$_4$, CaHPO$_4$, MgHPO$_4$, HSbP$_2$O$_8$, HSb$_3$P$_2$O$_{14}$, H$_5$Sb$_5$P$_2$O$_{20}$, |
| Polyacids such as | H$_3$PW$_{12}$O$_{40}$•nH$_2$O (n = 21-29), H$_3$SiW$_{12}$O$_{40}$•nH$_2$O (n = 21-29), H$_x$WO$_3$, HSbWO$_6$, H$_3$PMo$_{12}$O$_{40}$, H$_2$Sb$_4$O$_{11}$, HTaWO$_6$, HNbO$_3$, HTiNbO$_5$, HTiTaO$_5$, HSbTeO$_6$, H$_5$Ti$_4$O$_9$, HSbO$_3$, H$_2$MoO$_4$, |
| Selenites and arsenides such as | (NH$_4$)$_3$H(SeO$_4$)$_2$, UO$_2$AsO$_4$, (NH$_4$)$_3$H(SeO$_4$)$_2$, KH$_2$AsO$_4$, Cs$_3$H(SeO$_4$)$_2$, Rb$_3$H(SeO$_4$)$_2$, |
| Oxides such as | Al$_2$O$_3$, Sb$_2$O$_5$, ThO$_2$, SnO$_2$, ZrO$_2$, MoO$_3$, |
| Silicates such as | zeolites, (NH$_4^+$)-zeolites, sheet silicates, network silicates, H-natrolites, H-mordenites, NH$_4$-analcines, NH$_4$-sodalites, NH$_4$-gallates, H-montmorillonites, |
| Acids such as | HClO$_4$, SbF$_5$, |
| Fillers such as | carbides, in particular SiC, Si$_3$N$_4$, fibers, in particular glass fibers, glass powders and/or polymer fibers, preferably fibers based on polyazoles. |

Furthermore, this membrane can further comprise perfluorinated sulfonic acid additives (0.1-20 wt %, preferably 0.2-15 wt %, very particularly preferably 0.2-10 wt %). These additives lead to an improvement in performance, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are: Trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimide and Nafion.

Furthermore, the membrane can further comprise additives which scavenger the free peroxide radicals produced during reduction of oxygen (primary antioxidants) or destroy them (secondary antioxidants) and thereby improve the life and stability of the membrane and membrane-electrode unit, as described in JP2001118591 A2. The mode of action and molecular structures of such additives are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are: Bis(trifluoromethyl)nitroxide, 2,2-diphenyl-1-picrinylhydrazyl, phenols, alkylphenols, sterically hindered alkyl phenols such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl.2-nitrosopropane, benzophenone, benzaldehyde tert-butyl nitrone, cysteamine, melanines, lead oxides, manganese oxides, nickel oxides, cobalt oxides.

The invention further provides for the preferred use of the bridged polymer electrolyte blend membrane of the invention in a membrane-electrode unit (MEU) for fuel cells.

The membrane-electrode unit for a fuel cell comprises a polymer electrolyte membrane according to the invention and two electrodes between which the polymer electrolyte membrane is present in a sandwich-like fashion.

The electrodes each have a catalytically active layer and a gas diffusion layer to bring a reaction gas to the catalytically active layer. The gas diffusion layer is porous so that reactive gas can pass through it.

The bridged polymer electrolyte blend membrane of the invention can be used as an electrolyte membrane. Furthermore, the electrolyte membrane and a precursor for an MEU can be produced with one or two catalytically active layers. Furthermore, the MEU can also be produced by fixing the gas diffusion layer to the precursor.

The present invention further provides a fuel cell comprising a plurality of MEUs which each comprise a bridged polymer membrane produced by the above process and two electrodes between which the membrane of bridged polymer is present in a sandwich-like fashion.

The blend membranes produced by means of the process of the invention display a significantly increased fracture toughness.

The crosslinked blend membranes of the invention display, after doping in 85% strength by weight phosphoric acid (72 hours at 20° C.), a fracture toughness of more than 250 kJ/m², preferably more than 300 kJ/m², in particular more than 350 kJ/m².

EXAMPLES

The invention is illustrated below by means of examples and comparative examples, without the invention being restricted to these examples.

Example 1 a) Preparation of a PBI-DMAc Solution

®Celazole from Celanese is dissolved in N,N-dimethylacetamide "DMAc" (15% by weight of Celazole) at a temperature of 200° C. over a period of 2-4 hours.

b) Preparation of a Polysulfone Solution

Polysulfone ®Radel-R 5700 from Amoco (or polyether sulfone®Ultrason E 6000 from BASF) is dissolved in N,N-dimethylacetamide or N-methylpyrrolidone (15% by weight). The polysulfone solution is filtered at room temperature through a pressure filter.

c) Preparation of the Polymer Mixture in Solution

The PBI-DMAc solution and the polysulfone solution are mixed by means of a slow-running anchor stirrer at a temperature of 60-95° C. Lower temperatures and higher circumferential velocities of the stirrer lead, due to the Weissenberg effect which is displayed by the polybenzimidazole solution, to at least partial demixing of the solution. The mixed solution is degassed by application of a vacuum for a period of at least 15 minutes at a temperature of 80° C.

d) Production of the Polymer Membrane

The solution is applied in a thickness of about 250 μm to a glass plate by means of a doctor blade in a low-dust environment (laminar flow box) and dried at temperatures of up to 120° C. in a convection drying oven provided with a dust filter. The dried polymer membrane is peeled from the glass plate.

e) Doping of the Polymer Membrane

The membrane is wetted with 85-95% strength phosphoric acid at room temperature for 72 hours.

Membranes produced:

| Polymer type | Membrane type | Blend component % by weight | Crosslinker content mol % (based on PBI used) | Catalyst content mol % (based on PBI used) |
|---|---|---|---|---|
| Unmodified PBI | A | — | — | — |
| Blend membrane | B | 20% PES | — | — |
| Crosslinked membrane | C | — | 3% DGEBPA | 0.04 |
| Blend and crosslinker | D | 20% PES | 3% DGEBPA | 0.04 |

Mechanical Properties of the Membranes

The measurement of the mechanical properties is carried out by means of a uniaxial tensile test on strip-shaped specimens having a width of 15 mm and a length of 120 mm in accordance with ISO/R527. The tensile test is carried out at a temperature of 100° C. and an elongation rate of 50 mm/min. The results of the means of at least 5 measurements are summarized in the following tables.

| Membrane type | c(H3PO4) | Tensile strength (MPa) | Elongation at break (%) | Fracture toughness (kJ/m2) |
|---|---|---|---|---|
| A | 85% | 0.9 | 53 | 31 |
| B | 85% | 3 | 122 | 224 |
| C | 85% | 3.4 | 131 | 225 |
| D | 85% | 4.9 | 152 | 370 |
| B | 87% | 1.33 | 60 | 66 |
| C | 87% | 0.4 | 37 | 12 |
| D | 87% | 4.95 | 152 | 380 |
| B | 89% | 0.46 | 38 | 12 |
| C | 89% | 0.07 | 93 | 2.1 |
| D | 89% | 1.8 | 107 | 108 |
| D | 95% | 0.23 | 31 | 5.6 |

Acid Uptake and Conductivity

The specific conductivity is measured by means of impedance spectroscopy in a 4-pole arrangement in the potentiostatic mode using platinum electrodes (wires, 0.25 mm diameter). The distance between the current-collecting electrodes is 2 cm. The spectrum obtained is evaluated by means of a simple model consisting of a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and regulated via a Pt-100 resistance thermometer positioned in the direct vicinity of the specimen. After reaching the desired temperature, the specimen is maintained at this temperature for 10 minutes prior to commencement of the measurement. The specific conductivity at 120° C. is used as value for comparison.

Doping of all membrane types is carried out by storage under phosphoric acid for 72 hours at room temperature in a closed glass vessel. To determine the acid uptake, a circular specimen having a diameter of 3 cm is stamped out after doping. This piece is placed in a glass beaker containing 100 ml of water and the acid liberated is titrated to the equivalence point with 0.1 M NaOH. The specimen is subsequently dried at 150° C. and p<1 mbar for 15 hours in a vacuum drying oven and the dry weight is determined. The dry weight and the amount of NaOH consumed to the equivalence point are then used to calculate the ion-exchange capacity (IEC) or the acid content expressed as n(H3PO4)/n(PBI).

The results of these measurements are summarized in the following table.

| Membrane type | c(H3PO4) | IEC (meq/g) | n(H3PO4)/ n(PBI) | Conductivity at 120° C. |
|---|---|---|---|---|
| A | 85% | 88 | 9 | 0.093 |
| B | 85% | 70 | 7.2 | 0.076 |
| C | 85% | 74.8 | 7.7 | 0.089 |
| D | 85% | 67.6 | 6.9 | 0.07 |
| B | 87% | 96 | 9.9 | 0.094 |
| C | 87% | 113.8 | 11.7 | 0.093 |
| D | 87% | 75.1 | 7.7 | 0.078 |
| B | 89% | 120 | 12.3 | 0.117 |
| C | 89% | 175.9 | 18.1 | 0.134 |
| D | 89% | 107.8 | 11.1 | 0.105 |
| D | 95% | 324 | 33.2 | 0.149 |

The invention claimed is:

1. A membrane comprising a bridged polymer obtainable by a process comprising the following steps:
    A. preparing a solution comprising a basic polymer (polymer I) having at least one amino group per repeating unit and at least one bridging reagent and, in addition, at least one basic catalyst in at least one suitable solvent,
    B. casting a film using the solution obtained from step A),
    C. removing the solvent from step A),
    D. carrying out the bridging reaction in the film obtained in step C),
    E. doping the film obtained in step D) with a strong acid, wherein at least one further polymer based on a polysulfone (polymer II) in addition to the basic polymer (polymer I) is added in step A).

2. A membrane as claimed in claim 1, wherein the bridging reagent has at least two epoxide groups or isocyanate groups per molecule.

3. A membrane as claimed in claim 1, wherein the bridging reagent is at least one compound of the formula (II) and/or (III)

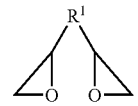

(II)

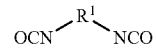

(III)

where $R^1$ is a hydrocarbon group having from 1 to 30 carbon atoms.

4. A membrane as claimed in claim 3, wherein $R^1$ is

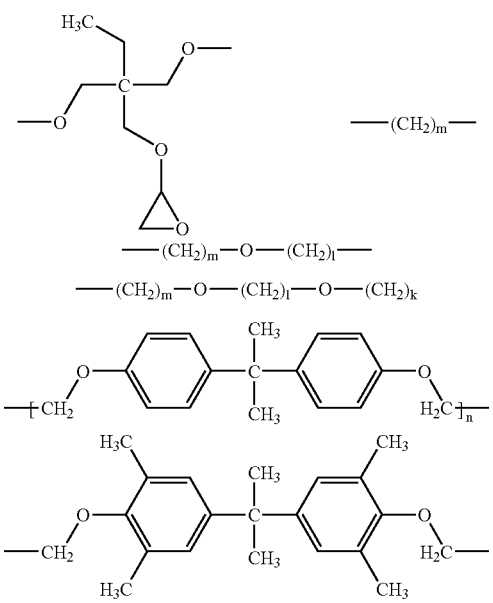

where m, k and l are identical or different and are each an integer from 1 to 6, and n is an integer from 1 to 10.

5. A membrane as claimed in claim 1, wherein the bridging reagent contains at least three epoxide groups per molecule.

6. A membrane as claimed in claim 5, wherein the bridging reagent is the compound

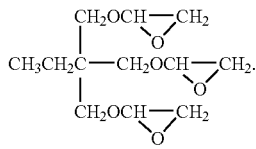

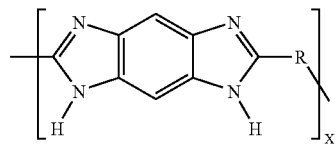

7. A membrane as claimed in claim 1, wherein the bridging reagent is bisphenol A glycidyl ether [BPAGDE] and/or 1,4-butanediol diglycidyl ether.

8. A membrane as claimed in claim 1, wherein the solution prepared in step A) contains from 0.1 to 7 mol % of the bridging reagent per unit of the basic polymer.

9. A membrane as claimed in claim 1, wherein polybenzimidazoles, polyimidazoles, polyvinylimidazoles, polybenzobisimidazoles and copolymers thereof are used as basic polymer.

10. A membrane as claimed in claim 9, wherein polybenzimidazoles used have the formula:

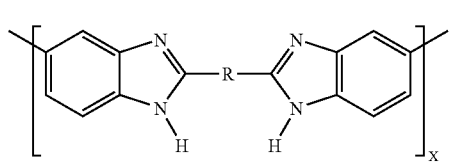

where R is alkylene, perfluoralkylene or a substituent of one of the following formulae:

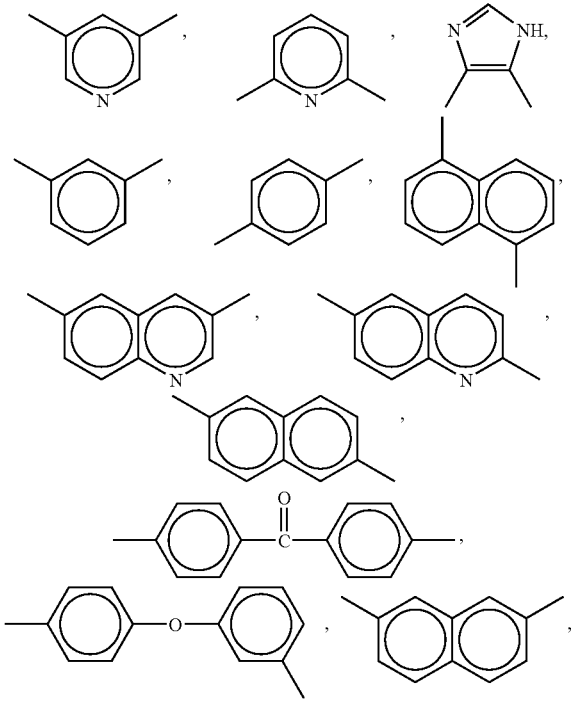

and each alkylene and perfuoroalkylene group R preferably has from 1 to 10 carbon atoms.

11. A membrane as claimed in claim 9, wherein polybenzobisimidazoles used have the formula where R is as defined in claim 10.

12. A membrane as claimed in claim 1, wherein the further polymer based on a polysulfone (polymer II) comprises one or more polysulfones comprising recurring units which have linking sulfone groups and correspond to the formulae 2A, 2B, 2C, 2D, 2E, 2F and/or 2G:

 (2A)

 (2B)

 (2C)

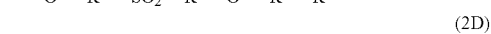 (2D)

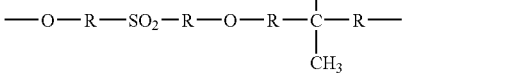

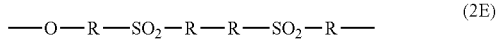 (2E)

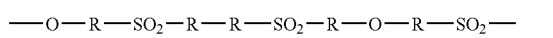 (2F)

 (2G)

where the radicals R are identical or different and are each, independently of one another, 1,2-phenylene, 1,3-phenylene, 1,4-phenylene, 4,4'-biphenyl, a divalent radical of a heteroaromatic, a divalent radical of a C10-aromatic and/or a divalent radical of a C14-aromatic, where the polysulfone preferably has no sulfonic acid groups.

13. A membrane as claimed in claim 12, wherein the number average molecular weight of the polysulfone is greater than 30,000 g/mol.

14. A membrane as claimed in claim 1, wherein the solution prepared in step A) comprises from 1 to 99 percent by weight of the basic polymer, with the bridging reagent and the basic catalyst being included, and from 99 to 1 percent by weight of the polymer based on polysulfone.

15. A membrane as claimed in claim 1, wherein bridging in step D) is carried out by heating, so that bridging (step D) and drying (step C) are carried out simultaneously in one step.

16. A membrane as claimed in claim 1, wherein drying of the film is carried out at a temperature below the reaction temperature of the bridging reagent and the film is subsequently heated further for the purpose of bridging.

17. A membrane as claimed in claim 1, wherein bridging in step D) is carried out by irradiation with electromagnetic waves (photochemical reaction).

18. A membrane as claimed in claim 1, wherein the strong acid used in step E) is phosphoric acid and/or sulfuric acid.

19. A membrane as claimed in claim 1, wherein the treatment in step E) is carried out using water or an aqueous acid and the polysulfone bears sulfonic acid groups and/or protonated sulfonic acid groups.

20. A membrane as claimed in claim 1, wherein basic catalysts used are basic oxides and hydroxides of the elements of main groups I, II and III of the Periodic Table, hybrides of the elements of main group I of the Periodic Table and organolithium compounds.

21. A membrane as claimed in claim 20, wherein basic catalysts used are KOH, LiOH, NaOH, RbOH, CsOH, $Ca(OH)_2$, $Mg(OH)_2$, $Ba(OH)_2$, LiH, NaH, KH, methyllithium and/or butyllithium.

22. A membrane as claimed in claim 1, wherein the basic catalyst is added to the solution in step A) in amounts of from 0.01 to 5 mol %, based on the bridging reagent used.

23. A membrane as claimed in claim 4, wherein n is 1.

24. A membrane as claimed in claim 10, wherein R has from 1 to 6 carbon atoms.

* * * * *